S. W. Valentine,
Shears.
Nº 49,178. Patented Aug. 1, 1865.
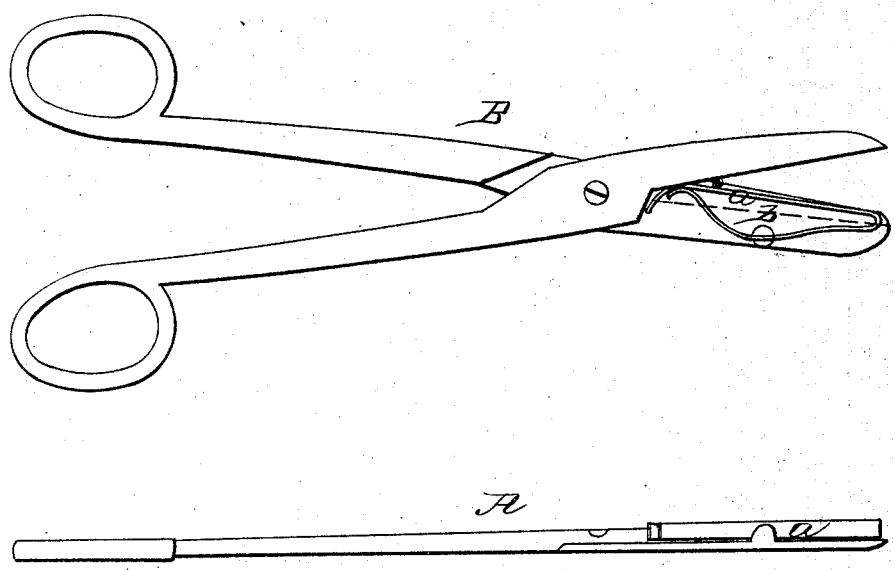
Witnesses:
Inventor:
Sam. W. Valentine
By his Atty

UNITED STATES PATENT OFFICE.

SAMUEL W. VALENTINE, OF BOSTON, MASSACHUSETTS.

IMPROVEMENT IN CUTTING AND GRASPING SHEARS.

Specification forming part of Letters Patent No. 49,178, dated August 1, 1865.

*To all whom it may concern:*

Be it known that I, SAMUEL W. VALENTINE, of Boston, in the county of Suffolk and State of Massachusetts, have invented Improved Cutting and Holding Shears; and I do hereby declare that the following, taken in connection with the drawings which accompany and form part of this specification, is a description of my invention, sufficient to enable those skilled in the art to practice it.

In cutting and gathering fruit and flowers beyond the reach of the hand, or where but one hand can be used, it is desirable to employ some means by which the fruit or flower may not only be clipped from the stem, but may be grasped by the cutting device and secured without falling.

It is to the construction of an instrument for this purpose that my invention relates, said invention consisting in the combination, with a shearing instrument, of a yielding holdfast or spring for grasping and holding the stem of the fruit or flower cut off by the shear-blades.

The drawing represents a pair of shears embodying my improvement, A showing a plan, and B a side elevation, of the same. The construction of the shear-blades or their operation does not differ from others; but to the inner face of one blade I affix a spring, *a*, in such manner that when the blades of the shears are apart the upper surface of the spring is in, or nearly in, line with the cutting-edge of the blade. The temper and strength of this spring are such that when the blades are brought together to cut a twig or stem the spring yields sufficiently to allow the cutting-edges to act together while it impinges against one side of the stem in such manner that as the same is severed it is held firmly between the spring and the edge of the opposite blade of the shears, while when the shears are again opened it regains its normal position. The spring is borne away from the edge of the blade to which it is attached by the edge of the opposite blade until the stem is reached by the blades, but while its inner end may yield to the action of the opposite blade, the rest of its upper surface retains such position with respect to the adjacent cutting-edge as to grasp the stem at whatever part of the blades it may be cut.

A stationary lip or shoulder piece is sometimes applied to one blade of a pair of shears, but as the upper surface of such lip piece has to be below the line *b*, to which the edge of the other blade comes when the shears are closed, it is practically inoperative for the purpose of grasping a fruit or flower stem when it is cut by the shears, as the fruit or flower will in most cases drop before it can be pinched between the lip-piece and the opposite blade; but by having the yielding piece *a*, with its surface on or adjacent to the cutting-edge of one blade and yielding to the pressure of the other blade or to the contact of the stem or twig, said piece does not interfere with the cutting action of the blades, and the stem or twig being grasped during this cutting action the fruit or flower will, of course, be secured without falling.

In cutting fruit or flowers beyond the reach of the hand one blade of the shears is to be fastened to the end of a pole and a cord attached to the other, so that the shears can be operated by the cord, as is usual in instruments of this character.

I claim—

A cutting and grasping shears having a yielding holdfast, for the purpose substantially as set forth.

In witness whereof I have hereunto set my hand this 15th day of June, A. D. 1865.

SAML. W. VALENTINE.

Witnesses:
 J. B. CROSBY,
 F. GOULD.